United States Patent [19]
Aron et al.

[11] Patent Number: 5,743,075
[45] Date of Patent: Apr. 28, 1998

[54] HAYMAKING MACHINE

[75] Inventors: Jerome Aron, Dossenheim-Sur-Zinsel; Marc Helfer, Ottersthal, both of France

[73] Assignee: Kuhn, S.A., Saverne Cedex, France

[21] Appl. No.: 713,122

[22] Filed: Sep. 16, 1996

[30] Foreign Application Priority Data

Sep. 15, 1995 [FR] France .................................. 95 11003

[51] Int. Cl.$^6$ .................................................. A01D 78/10
[52] U.S. Cl. .................................. 56/366; 56/369; 56/372; 56/377; 56/380; 56/DIG. 14
[58] Field of Search ............................. 56/369, 366, 367, 56/372, 377, 380, 384, 396, DIG. 3, DIG. 9, DIG. 10, DIG. 14

[56] References Cited

U.S. PATENT DOCUMENTS 4,015,413  4/1977  van der Plas et al. ........ 56/DIG. 14 X

FOREIGN PATENT DOCUMENTS

| 317 746 | 5/1989 | European Pat. Off. . |
| 2016419 | 5/1970 | France . |
| 2 649 286 | 1/1991 | France . |
| 2 043 890 | 3/1971 | Germany . |
| 2840632 | 4/1979 | Germany ......................... 56/377 |
| 88 07 385 | 9/1988 | Germany . |
| 90 02 630 | 6/1990 | Germany . |
| 90 02 629 | 7/1990 | Germany . |

*Primary Examiner*—Terry Lee Melius
*Attorney, Agent, or Firm*—Oblon, Spivak, McClelland, Maier & Neustadt, P.C.

[57] ABSTRACT

A haymaking machine which includes a frame that has two windrowing rotors driven in rotation about substantially vertical axes, the frame having a linkage beam which connects the axle of the first rotor to that of the second rotor, the beam being articulated to the axle of the first rotor. The linkage beam includes at least one transverse joint shaft and the first rotor includes a toothed ring which meshes with a first gear wheel which is formed as one piece with a drive shaft and with a second gear wheel which is formed as one piece with a transmission shaft which extends to the second rotor and which includes a third gear wheel which meshes with a toothed ring of this rotor. The transmission shaft is housed in the linkage beam and is pivotable with the latter about the axle of the first rotor, the transmission shaft including at least one universal joint at the level of the joint shaft the linkage beam.

20 Claims, 6 Drawing Sheets

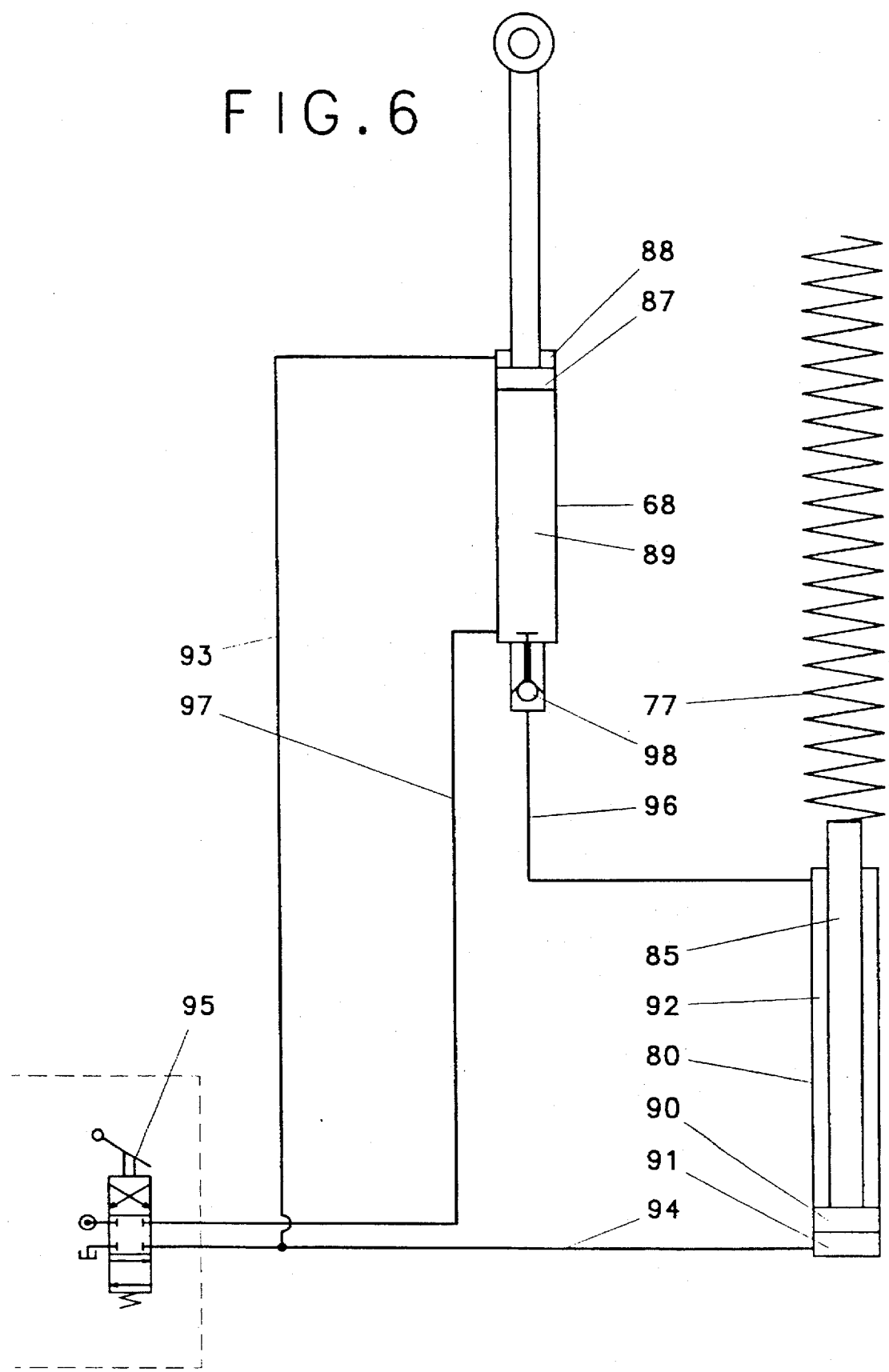

HAYMAKING MACHINE

BACKGROUND OF THE INVENTION

1. Field of the Invention

This invention pertains to a haymaking machine, in particular a windrower of cut vegetables, consisting of a frame bearing two windrowing rotors that are driven in rotation during operation around substantially vertical axles provided with support wheels. This frame has a traction beam that can be connected to a tractor and a linkage beam which connects the substantially vertical axle of the first rotor to the substantially vertical axle of the second rotor. This linkage beam is articulated to the approximately vertical axle of the first rotor so as to be able to be displaced with the second rotor in several positions.

2. Discussion of the Background

On a machine of this kind, known from the patent FR 2,016,419, the beam connecting the two rotors is rigid. For this reason, these rotors cannot correctly follow the unevenness of the ground during operation. It is possible that one of the rotors is partially lifted as a result of the other rotor passing over a bump. In this case, it does not collect all the vegetables on the ground, this being harmful to the operating quality of windrowing. In addition, the driving in rotation of the second rotor on this machine is ensured from the first rotor by means of a belt located in a horizontal plane. The forces that can be transmitted by means of such belt are limited. It is then possible, during windrowing of green forage which is consequently relatively heavy, that the belt will begin to slip and can no longer drive the second rotor.

On another known machine (patent FR 2,649,286), the first rotor is connected to a traction arm. The second rotor is articulated to the rear end of a linkage beam by means of a spherical joint. The forward end of this beam is articulated to the traction arm by means of a second spherical joint located in front of the axis of rotation of the first rotor. In this case, the second rotor lacks stability when the machine is displaced on very uneven terrain. In addition, its rotational drive is ensured by means of shafts that extend out from a bevel gearbox located on the traction arm. These shafts are connected to one another, at the level of the two spherical joints of the linkage beam, by universal joints which are subjected to fluctuations of angles in the turns. These driving means are complicated and may be damaged if said angle fluctuations are great.

SUMMARY OF THE INVENTION

The goal of this invention is to propose a machine such as described in the introduction which does not have the aforementioned disadvantages of known machines.

To reach this goal, an important characteristic of the invention consists of the fact that the linkage beam including at least one approximately horizontal transverse joint shaft, and that the first rotor includes a toothed ring that meshes with a first gear wheel, which is firmly attached to a drive shaft, and with a second gear wheel, which is firmly attached to a transmission shaft which extends up to the second rotor and which includes a third gear wheel which meshes with a toothed ring of the second rotor, which transmission shaft is situated in the linkage beam and can pivot with the latter about the approximately vertical axle of the first rotor, said transmission shaft including at least one universal joint or similar structure which is located at the level of the transverse joint shaft of the linkage beam.

This fitting allows each rotor to be displaced in terms of height independently of one another. Each rotor can correctly follow the surface of the ground and collect the entire amount of fodder located there. The driving of the second rotor by means of a transmission shaft from the first rotor is simple. It allows one to transmit rather large forces under difficult working conditions. In addition, the displacements of the linkage beam and of the second rotor around the approximately vertical axle of the first rotor can be great, without this having unfavorable consequences on the transmission means.

Another characteristic of the invention consists of the fact that a holding device is arranged between the traction beam and the linkage beam. This device furthers placement of the second rotor in a position which is offset laterally with respect to the first rotor during operation. This is particularly advantageous when adherence to the ground of the carrier wheels of the second rotor is too weak to hold it in place.

BRIEF DESCRIPTION OF THE DRAWINGS

Other characteristics and advantages of the invention will be apparent from the description that follows and which refers to the attached drawings which represent, by way of non-limiting examples, one form of implementation of the machine in accordance with the invention.

In these drawings:

FIG. 6 represents schematically one example of an implementation of means to displace the second rotor.

DESCRIPTION OF THE PREFERRED EMBODIMENTS

Figure 1:
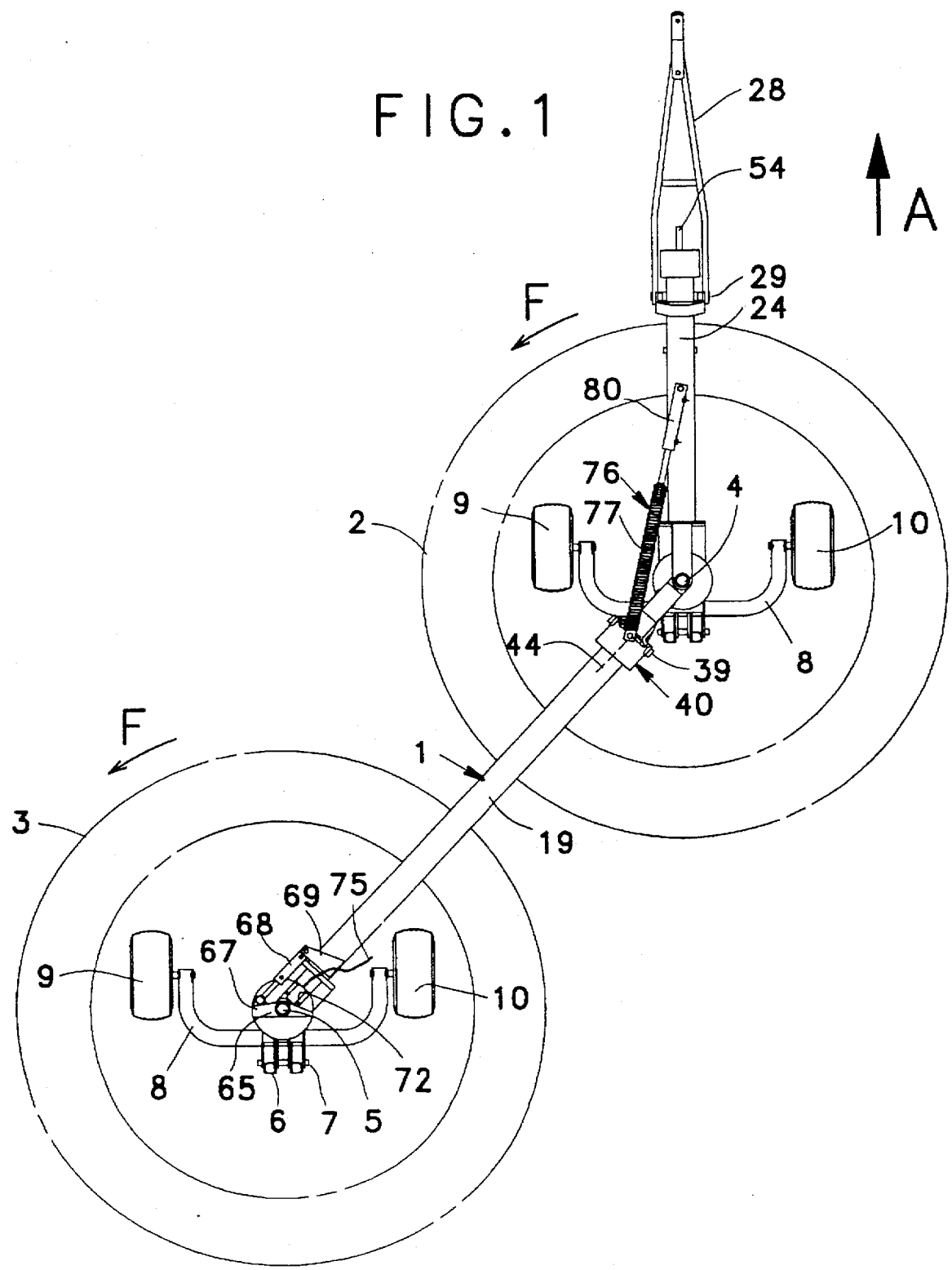
FIG. 1 represents a top view of the machine in accordance with the invention in a working position.
Figure 2:
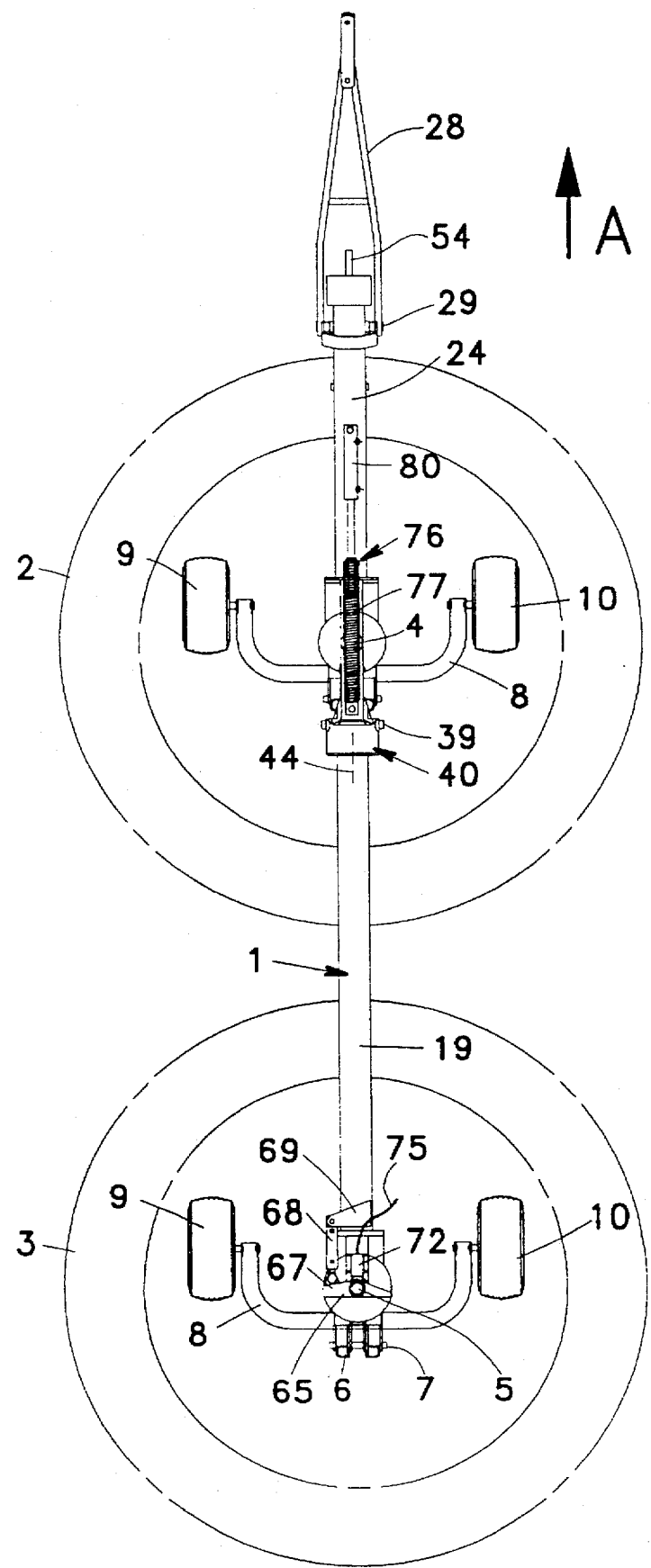
FIG. 2 represents a top view of the machine in accordance with the invention in a transport position.
Figure 3:
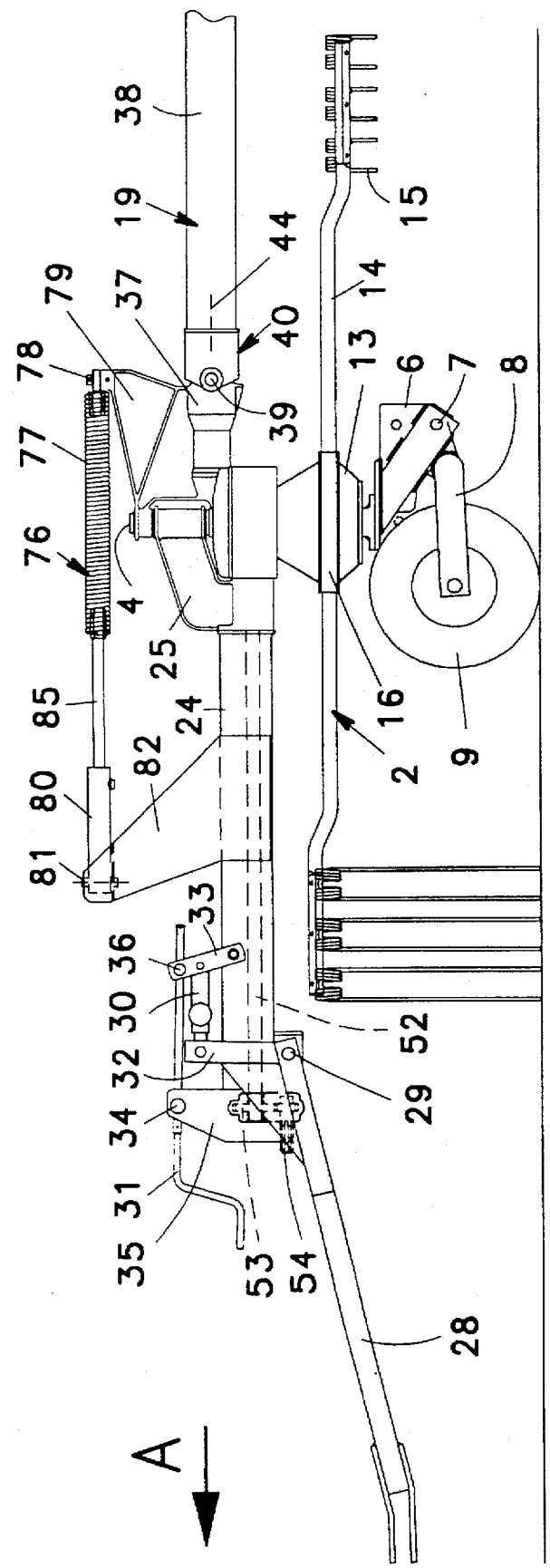
FIG. 3 represents, on a larger scale, a side view of the front part of the machine.

As shown in FIGS. 1 to 3, the machine, in accordance with the invention, includes a frame 1 which carries two rotors 2, 3 for windrowing. These rotors 2, 3 are mounted in a rotating manner on approximately vertical axles 4, 5. Each of these axles 4 and 5 carries at its lower end a support 6 to which is articulated by member 7 a bend 8 provided with two carrier wheels 9, 10. A hydraulic jack 12 is arranged between each support 6 and a plurality of lugs 11 are provided which are integral with the corresponding bend 8. The hydraulic jack allows one to displace the bend 8 about its articulation 7 with the corresponding support 6 in order to modify the distance from the corresponding rotor 2, 3 with respect to the ground.

Each rotor 2, 3 is comprised essentially of a central casing 13 which is mounted on the corresponding axle 4, 5 by means of ball bearings. This central casing 13 carries several arms 14 which extend into a substantially horizontal plane. The latter are provided at their most remote end from said casing 13 with raking forks 15. These arms 14 are mounted in bearings 16 of said casing 13 in such a manner as to be able to pivot about the longitudinal geometric axes thereof. In each central casing 13, there is located a control cam 17 which is attached to the corresponding axle 4, 5. Each fork-carrying arm 14 has at its end located inside the casing 13 a roller 18 which works together with said control cam 17.

A linkage beam 19 connects the approximately vertical axle 4 of the first rotor 2 to the axle 5 of the second rotor 3. The forward end of this beam 19 is articulated to the axle 4 of the first rotor 2 (see FIG. 4). For this purpose, it includes two bearings 20 and 21 with smooth rings in which the axle 4 passes. By virtue of these rings, the beam 19 can pivot about said axle 4 allowing one to modify the position of the second rotor 3 with respect to the first rotor 2. The rear end of the beam 19 has an elbow 22 which is articulated to the axle 5 of the second rotor 3. To achieve this, this elbow 22 has a bearing 23 with a smooth ring in which said axle 5 passes. The latter can then turn on itself with respect to the linkage beam 19 (see FIG. 5).

A traction beam 24 is also attached to the substantially vertical axle 4 of the first rotor 2. It includes an elbow 25 with a bearing 26 which is located between the two bearings 20 and 21 of the linkage beam 19. It is prevented from rotating on this axle 4 by the means of a key 27. This traction beam 24 extends horizontally forward (as seen in the direction of advance A). At its front end, a beam 28 is articulated by means of an axle 29. The latter allows one to attach the machine to a tractor. The position of this beam 28 with respect to the traction beam 24 is controllable by means of a hydraulic jack 30 and a crank 31. This hydraulic jack 30 is connected to an arch 32 which is rigidly fastened to the beam 28 and to a lever 33 which is articulated to the traction beam 24. The crank 31 is, on the one hand, guided so that it is free in rotation and stationary in translation in an axle 34 which is articulated to a fork 35 of the traction beam 24 and, on the other hand, screwed into a threaded hole of a second axle 36 which is articulated to the lever 33.

The hydraulic jack 30 allows one to modify in an important manner the relative position between the beam 28 and the traction beam 24 during position changes of the machine, while the crank 31 allows one to make more precise adjustments. The hydraulic jack 30 can advantageously be connected to hydraulic tubes that supply the hydraulic jacks 12 located beneath the rotors 2 and 3 so that they will act together to lift or lower the machine.

The linking beam 19 is comprised of two parts 37, 38 that are connected to one another by an axle 39 which is transverse with respect to the direction of advance A and is oriented approximately horizontally. This axle 39 is located near the approximate vertical axle 4 of the first rotor 2. Because of this, the part 38 which is connected to the second rotor 3 is relatively long, allowing the latter to be displaced heightwise to a great extent to follow the contour of the ground.

Figure 4:
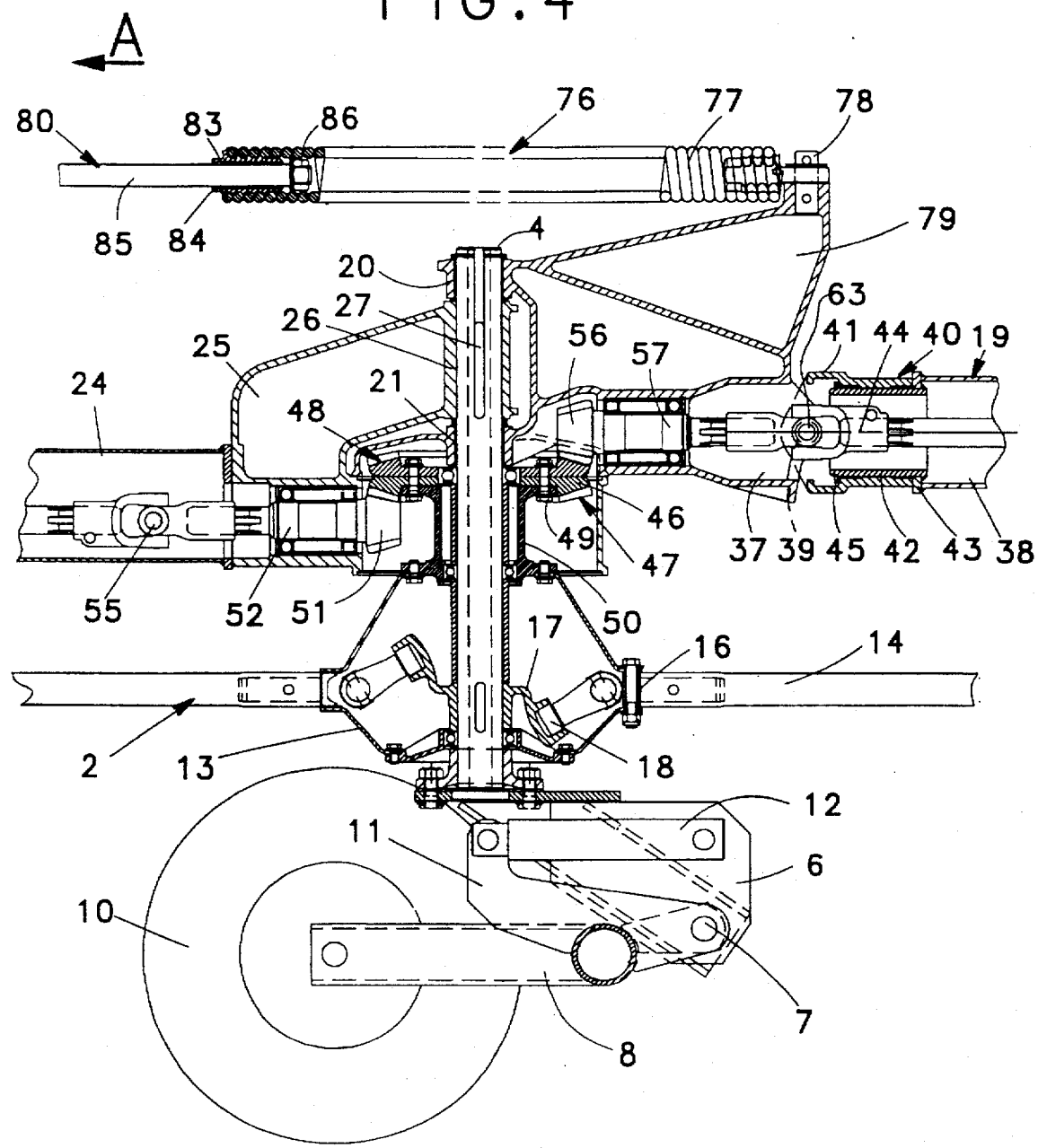
FIG. 4 represents a section of the first rotor along an approximately vertical plane.
Figure 5:
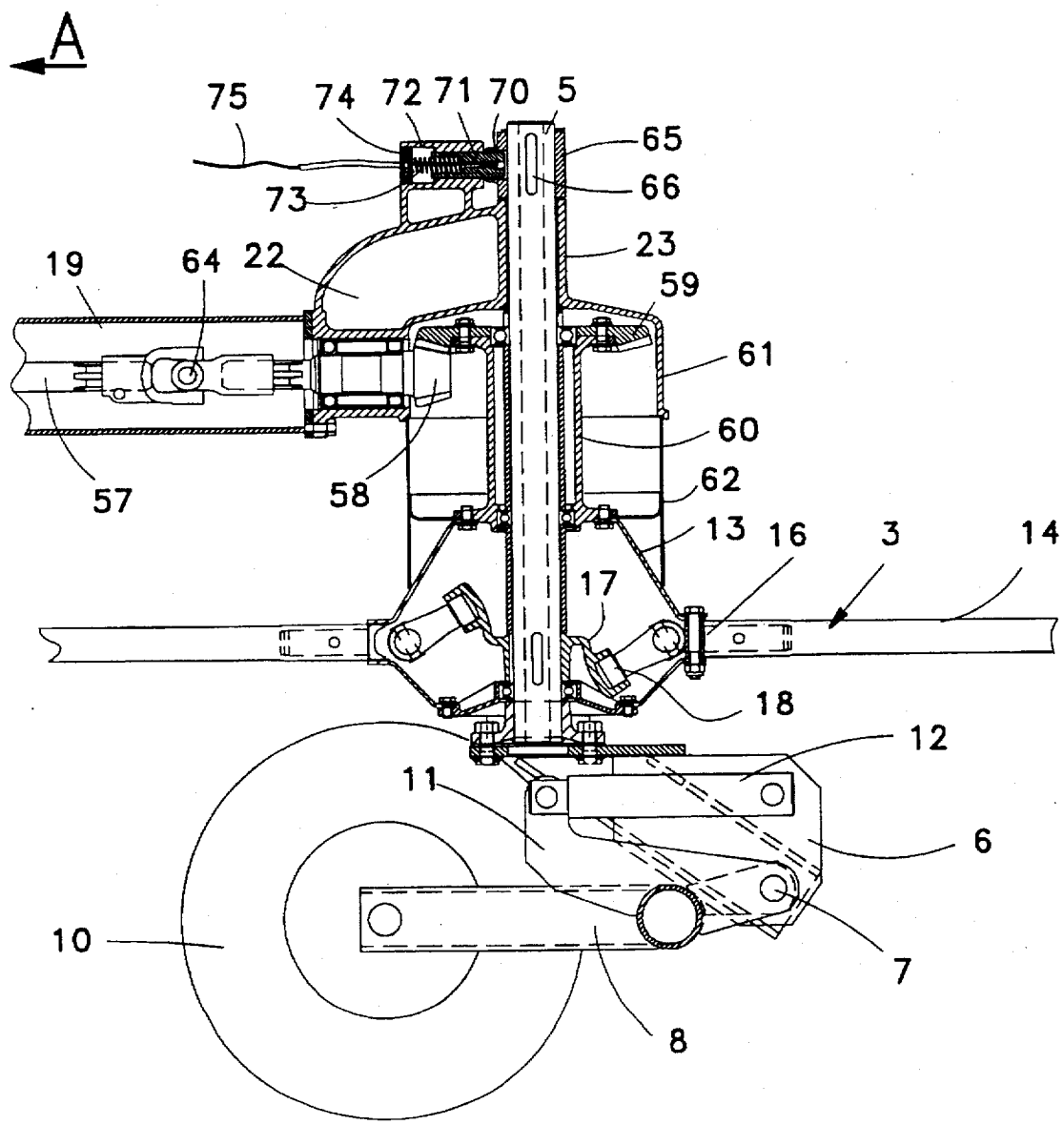
FIG. 5 represents a section of the second rotor taken along an approximately vertical plane.

It is clear from FIG. 4 that the linkage beam 19 can include a second joint 40 which is directed along the longitudinal direction. For this purpose the forward end of its part 38 is comprised of a sleeve 41 which carries the transverse joint shaft 39. In this sleeve 41 a tube 42 is situated which is relatively short and is welded to a crown wheel 43 which is itself welded to the part 38 of the beam 19. The tube 42 is guided into the sleeve 41 by means of smooth rings so that it can turn on itself about its longitudinal geometric axis 44. It is locked in the axial direction, on the one hand, by the crown wheel 43 and, on the other hand, by a stop ring 45. This arrangement allows the part 38 of the beam 19 and the second rotor 3 to pivot about the longitudinal geometric axis 44 in order to better follow the irregularities of the ground.

The rotational drive of the two rotors 2 and 3 is ensured mechanically from the power take-off shaft of the tractor. For this reason the first rotor 2 includes a toothed ring 46 with two cone-shaped teeth 47 and 48. It is made in two parts that are assembled to one another by the means of bolts 49. This crown wheel 46 is attached with the same bolts 49 on an upper side of a brace 50 which is also attached to the central casing 13 of the rotor 2. One group of teeth 47 of the set of teeth is directed downward and meshes with a first gear wheel 51. The latter is integral with a drive shaft 52 which extends into the traction arm 24 in the direction of the tractor. Its forward end is located in a reduction gearbox 53 arranged at the forward end of the traction beam 24. In this gearbox 53 said end carries a toothed wheel which meshes with a second toothed wheel of a smaller diameter. The latter is mounted on a shaft 54 which comes out of the gearbox 53 and which can be connected to the power take-off shaft of the tractor by means of an intermediate shaft with universal joints not shown here.

The drive shaft 52 is made in two parts that are connected to one another by means of a universal joint 55 such as a Cardan universal joint or a joint with pins that mesh with one another. This joint allows one to overcome a possible defect of alignment between the first gear wheel 51 and the toothed wheel of the reduction gearbox 53 which are both located on the drive shaft 52.

The second teeth set 48 is directed upward and meshes with a second gear wheel 56 located above it. This second gear wheel 56 is formed as one piece with a transmission shaft 57 which extends to the second rotor 3 (see FIG. 5). The rear end of this shaft 57 carries a third gear wheel 58 which meshes with a toothed ring 59 which is located above the said third gear wheel 58. For this purpose, the two rotors 2 and 3 are driven in rotation in the same direction. The ring 59 is connected to the central casing 13 of the second rotor 3 by means of a brace 60. It is surrounded by a protective box 61, which is rigidly fastened to the linkage beam 19. The brace 60 carries a flange 62 which extends from the central casing 13 to the box 61 and prevents the entrance of any foreign substances into the latter.

The transmission shaft 57 is located in the linkage beam 19. It pivots with this beam around the approximately vertical axle 4 of the first rotor 2. The second gear wheel 56 is then displaced on the ring 46. For this reason, the pivoting angle of the linkage beam 19 can be quite considerable without there being any danger of breaking the transmission means of the drive movement.

One can see from FIG. 4 that the transmission shaft 57 includes a universal joint 63 such as a Cardan universal joint or a joint with pins which mesh at the level of the transverse joint shaft 39 of the linkage beam 19. The shaft 57 can then be displaced with the rear part 38 of the linkage beam 19 and with the second rotor 3 when the latter passes over ground unevenness. The transmission shaft 57 advantageously includes a second universal joint 64 of the Cardan joint type or a joint with pins (see FIG. 5). The latter is located in proximity of the third gear wheel 58. It allows one to overcome a possible defect of alignment between the third cone-shaped gear wheel 58 which is arranged on the rear end of the transmission shaft 57 and its relatively remote end which is connected to the first universal joint 63.

The upper extremity of the approximately vertical axle 5 of the second rotor 3 carries a sleeve 65. The latter is located above the bearing 23 of the linkage beam 19 and is attached to the axle 5 by means of a key 66. The sleeve 65 has a lateral arm 67 with a fork which is used for hitching the rod of a hydraulic jack 68. The body of this jack 68 is articulated to a fork 69 which is rigidly fastened to the linkage beam 19. The hydraulic jack 68 can be controlled from the tractor. It allows one to displace the sleeve 65 in such a manner that it causes the approximately vertical axle 5 to pivot about itself.

The sleeve 65 also includes a locking casing 70 in which can be inserted a bolt 71 in the transport position. This bolt 71 is located in a sheath 72 which is rigidly fastened to the elbow 22 of the linkage beam 19. It can be displaced longitudinally in this sheath 72 so that its end can be withdrawn from the locking casing 70 in order to free the sleeve 65 and the approximately vertical axle 5. A pressure spring 73 which pushes the bolt 71 in the direction of the locking casing 70 is also placed in the sheath 72. On one side, it rests against the bolt 71 and on the other side against a closing wall 74 of the sheath 72. A control cable 75 which extends to the seat of the tractor is attached to said bolt 71. This cable 75 allows one to pull the bolt 71 against the stress of the spring 73 in order to unblock the sleeve 65 and the approximately vertical axle 5 of the second rotor 3.

A holding device 76 is arranged between the traction beam 24 and the linkage beam 19 in order to further the placement of the second rotor 3 in a position that is laterally offset with respect to the first rotor 2 during operation.

In the example shown here, a traction member such as a spring 77 is connected by one of its ends to a shaft 78 of a lug 79 which is rigidly connected to the part 37 of the linkage beam 19. The other end of this spring 77 works with a hydraulic jack 80 which is articulated by means of a shaft 81 on an arm 82 of the traction beam 24. The spring 77 passes above the approximately vertical axle 4 of the first rotor 2. The axis of shaft 81 of the hydraulic jack 80 and the axis of shaft 78 of the spring 77 are placed in vertical planes directed along the direction of advance A and each one passes through the middle of the corresponding beam 19 and 24, when the machine is in transport position (FIG. 2). The end of the spring 77 which works with the hydraulic jack 80, includes a ring 83 with a cylinder bore 84 whose diameter is slightly greater than the diameter of the rod 85 of the hydraulic jack 80. This rod 85 extends through this cylinder bore 84 with slight play and includes at its end located beyond the ring 83, inside the spring 77, a stop 86 whose external dimensions are greater than the diameter of the cylinder bore 84. In this manner it is possible to extend the spring 77 with the jack 80 by making its rod 85 return. This operation can advantageously be combined with one which consists in modifying the orientation of the approximately vertical axle 5 and the wheels 9 and 10 of the second rotor 3. For this purpose this hydraulic jack 80 is joined to the hydraulic tubes that go to the hydraulic jack 68 which controls said axle 5. Thus, when this last hydraulic jack 68 extends in order to orient the axle 5 and the wheels 9 and 10 toward the side, for placing them in working position, the other hydraulic jack 80 shortens and extends the spring 77 so that it pulls on the linking beam 19. Conversely, when the hydraulic jack 68 shortens in order to orient the axle 5 and the wheels 9 and 10 in the opposite direction, in order to place them in transport position, the hydraulic jack 80 extends and relaxes the spring 77.

In the following description of the example of implementation shown in FIG. 6, the pieces that correspond with the aforementioned example will not be described in detail and will retain their former reference number. In accordance with this example, the hydraulic jack 68 has a piston 87 separating its internal space into two chambers 88 and 89. The hydraulic jack 80 includes a piston 90 whose rod 85 is connected to the spring 77. This piston 90 also separates the internal space of the hydraulic jack 80 into two chambers 91 and 92. The first chambers 88 and 91 of these two jacks 68 and 80 are connected by pipes 93 and 94 to a distributor 95 or analogue of the tractor. Their second chambers 89 and 92 are connected to one another by a tube 96. The second chamber 89 of the jack 68 is in addition connected to the distributor 95 by a tube 97. This jack 68 includes at the level of the branching of the tube 96 a valve 98 of a non-return valve type. In its normal position this valve 98 allows oil to pass in the direction of the second chamber 92 of the hydraulic jack 80 but prevents its return. However, it is actuated so that it will free the passage of oil in order to allow its return through the distributor 95 via the second chamber 89, by the piston 87 when it arrives at the end of its stroke.

As will be apparent from FIG. 1, during operation the windrower is displaced in the direction A by means of a tractor. The carrier wheels 9 and 10 then roll along the ground. The second rotor 3 is offset laterally with respect to the first rotor 2. They are arranged along an oblique line with respect to the direction of advance A so that their trajectories partially overlap. The second rotor 3 is placed in this position by means of the hydraulic jack 68 which orients its carrier wheels 9, 10 and by means of the holding device 76. The two rotors 2 and 3 are driven in the same direction of rotation F, about their support axles 4 and 5, from the power take-off shaft of the tractor. The drive shaft 52 and the gear wheel 51 then ensure drive power of the first rotor 2. The transmission shaft 57 and the gear wheels 56 and 58 transmit the movement of the first rotor 2 to the second rotor 3. As a consequence of this rotation of the rotors 2 and 3, the roller wheels 18 located at the ends of the fork-carrying arms 14 are displaced in the cam 17 which is located in the corresponding casing 13. Cam 17 then controls said arms 14 so that the forks 15 are directed toward the ground in the front part of the trajectory and so that they pivot upward in the lateral part in which they are displaced toward the rear (as seen in the direction of movement A). In said forward part, the forks 15 gather the fodder lying on the ground. Next they deposit it in the shape of a swath as a result of their pivoting in the lateral part of their trajectory. Because of the arrangement of the two rotors 2, 3, the swath formed by the most forward rotor 2 position is picked up again by the other rotor 3 which forms a lateral swath of large volume. Each of the rotors 2, 3 follows the unevenness of the ground independently of one another because of the degrees of freedom provided by the transverse joint axle 39 and the longitudinal geometric pivoting axis 44 of the linkage beam 19.

In order to transpose the windrower to the transport position shown in FIG. 2, the operator actuates the hydraulic jacks 12 which lift the rotors 2 and 3 from the ground and the hydraulic jack 30 which lifts the forward part of the traction beam 24. In this manner the road clearance is sufficient to displace the machine along the paths and roads. Finally, he actuates the hydraulic jack 68 so that it shortens and turns the sleeve 65, the support axle 5 and the carrier wheels 9 and 10 so that the latter are oriented in a direction parallel to the linkage beam 19. Simultaneously, the hydraulic jack 80 of the holding device 76 stretches and relaxes the spring 77. It then suffices to displace the machine in the direction A so that the second rotor 3 and the linkage beam 19 pivot about the approximately vertical axle 4 of the first rotor 2 and are placed behind the latter. The width of the machine is then considerably reduced. In this position, the bolt 71 is pushed by the spring 73 into the locking casing 70 of the sleeve 65. It then stops the axle 5 and the wheels 9 and 10 and by this action avoids inadvertent return of the second rotor 3 into the work position. In the curved parts of the trajectory followed by the machine, the second rotor 3 follows the first rotor 2 in the manner of a trailer. The lengthening of the hydraulic jack 80 is such that the stop piece 86 which is secured to its rod 85 is distanced from the ring 83 of the spring 77. The latter can then slide freely on the said rod 85 of the jack 80, which allows the linkage beam 19 and the second rotor 3 to be displaced to the right or to the left about the axle 4 of the first rotor 2. During these displacements the gear wheel 56 of the transmission shaft 57 is displaced on the teeth set 48 of the toothed ring 46. This prevents the transmission shaft 57 from folding up around a joint.

In order to return to the work position the operator pulls out the bolt 71 from its casing 70 in the sleeve 65 by means of the cable 75. Next he actuates the hydraulic jack 68 so that it becomes longer and causes the sleeve 65, the axle 5, and the wheels 9 and 10 to turn so that the direction of the latter forms an angle with the linkage beam 19. At the same time, the hydraulic jack 80 retracts and stretches the spring 77. As soon as the operator moves forward with the machine the second rotor 3 turns with the linkage beam 19 about the axle 4 of the first rotor 2 and is offset laterally. In this position, the hydraulic jack 80 and the spring 77 exert a traction force on the linkage beam 19 and help to maintain it in work position. Lastly, the hydraulic jacks 12 and 30 are actuated so that the machine lowers down until the forks 15 touch the ground. The two rotors 2 and 3 can then again be driven in rotation.

In the example relating to FIG. 6, the hydraulic jacks 68 and 80 are controlled in the same manner as described previously to transpose the machine from the transport position to the work position and vice versa. In all cases, in the work position, that is to say when the jack 68 is elongated and the jack 80 is retracted, the oil is blocked in the second chamber 92 from the latter by the valve 98. It is then possible for the rod of the jack 68 more or less to return so that it will modify the orientation of the sleeve 65, of the axle 5 and of the wheels 9 and 10 of the second rotor 3. The latter is displaced then more or less toward the rear of the first rotor 2, which allows one to modify the working width of the machine as a function of the configuration of the ground and/or of the amount of forage to be windrowed. The jack 80 and the spring 77 constantly exert the traction force on the linkage beam 19 in these different work positions.

Finally, when one wishes to place the machine in transport position the hydraulic jack 68 is controlled so that it will totally retract. As soon as its piston 87 arrives at the end of the stroke it will open the valve 98 and release the oil which blocked the hydraulic jack 80 and the spring 77. This jack 80 can then be expanded as has already been described, in order to facilitate transport of the machine.

It is quite evident that the invention is not limited to the mode of implementation described and represented in the attached drawings. Some modifications are possible, especially with respect to the composition of the different components or by substitution of technical equivalents, without thereby departing from the scope of protection as defined in the claims.

What is claimed as new and desired to be secured by Letters Patent of the United States is:

1. A haymaking machine, which comprises:
   a frame having first and second rotors which are driven respectively in rotation around first and second substantially vertical axles and which are provided with carrier wheels;
   a traction beam which is connectable to a tractor,
   a linkage beam which connects the approximately vertical axle of the first rotor to the approximately vertical axle of the second rotor, said linkage beam being articulated to said approximately vertical axle of the first rotor, said linkage beam including at least one transverse joint shaft which is substantially horizontal wherein the first rotor includes a toothed ring which meshes with a first gear wheel which is rigidly fastened to a drive shaft and with a second gear wheel which is rigidly fastened to a transmission shaft which extends towards the second rotor and which includes a third gear wheel which meshes with a toothed ring of the second rotor, and wherein said transmission shaft is located in the linkage beam and is pivotable with the linkage beam about the approximately vertical axle of the first rotor, and
   said transmission shaft includes at least one universal joint which is located at a level of the transverse joint shaft of the linkage beam.

2. Machine in accordance with claim 1, wherein the toothed ring includes first and second teeth sets wherein said first teeth set is directed downwardly and meshes with the first gear wheel and said second teeth set is directed upwardly and meshes with the second gear wheel.

3. Machine in accordance with claim 1, wherein the transverse joint shaft of the linkage beam is located in proximity with the approximately vertical axle of the second rotor.

4. Machine in accordance with claim 1, wherein the linkage beam includes a second joint which allows the second rotor to pivot about a geometric axis which is directed in a longitudinal direction of the linkage beam.

5. Machine in accordance with claim 4, wherein the linkage beam includes a tube which is inserted in a sleeve which is connected to the transverse joint shaft, said tube being freely rotatable and being secured in an axial direction with respect to the said sleeve.

6. Machine in accordance with claim 1, wherein the transmission shaft includes a second universal joint which is located in proximity with the third gear wheel.

7. Machine in accordance with claim 1, wherein the traction beam of the frame is secured to the approximately vertical axle of the first rotor.

8. Machine in accordance with claim 7, wherein the drive shaft is encased in the traction beam and includes a universal joint which is located in proximity with the first gear wheel.

9. Machine in accordance with claim 1, which comprises a hydraulic jack which is articulated to the linkage beam and to a sleeve which is secured to the approximately vertical axle of the second rotor.

10. Machine in accordance with claim 1, which comprises a bolt locking the approximately vertical axle of the second rotor in at least one transport position.

11. Machine in accordance with claim 10, wherein the bolt is encased in a sheath which is formed as one piece with an elbow of the linkage beam and is displaceable in said sheath by a spring and a control cable.

12. Machine in accordance with claim 1, which comprises a holding device which is located between the traction beam and the linkage beam.

13. Machine in accordance with claim 12, wherein the holding device comprises a traction spring which is coupled by one end thereof to the linkage beam and at another end thereof to a first hydraulic jack attached to the traction beam.

14. Machine in accordance with claim 13, wherein the traction spring is connected to a shaft of a lug which is rigidly fastened to a part of the linkage beam, and wherein the axis of said shaft is located in a vertical plane that passes through the middle of the linkage beam and is oriented in a direction of advance of the frame in transport position.

15. Machine in accordance with claim 13, wherein the first hydraulic jack is articulated by a shaft to an arm of the traction beam, the axis of said shaft being located in a vertical plane which passes through the middle of the traction beam and is directed in the direction of advance of the frame in transport position.

16. Machine in accordance with claim 13, wherein an end of the spring which cooperates with the first hydraulic jack includes a ring with a cylinder bore through which a rod of the hydraulic jack extends with a small play, said rod having a stop piece at an end thereof located beyond the ring.

17. Machine in accordance with claim 13, which comprises a second hydraulic jack which is articulated to the linkage beam and to a sleeve which is secured to the approximately vertical axle of the second rotor wherein the first hydraulic jack of the holding device is coupled to hydraulic tubes which communicate with said second hydraulic jack.

18. Machine according to claim 13, which comprises a second hydraulic jack which is articulated to the linkage beam and to a sleeve which is secured to the approximately vertical axle of the second rotor, wherein each of said first and second jacks includes a first chamber which is connected to a hydraulic distributor by a plurality of tubes and a second chamber and wherein said second chambers are connected to one another by a tube and the second chamber of the second hydraulic jack which is articulated to the sleeve of the second rotor is also connected to the distributor by a tube.

19. Machine according to claim 18, wherein the second hydraulic jack which is articulated to the sleeve of the second rotor includes at a level of the branching of the tube which connects the second chambers of the jacks a non return valve.

20. Machine according to claim 19, wherein the second hydraulic jack which is articulated to the sleeve of the second rotor includes a piston actuating the valve.

* * * * *